March 29, 1966  C. C. BLAND  3,243,273
METHOD AND APPARATUS FOR PRODUCTION OF GLASS BEADS
BY DISPERSION OF MOLTEN GLASS
Filed Aug. 12, 1957  2 Sheets-Sheet 1
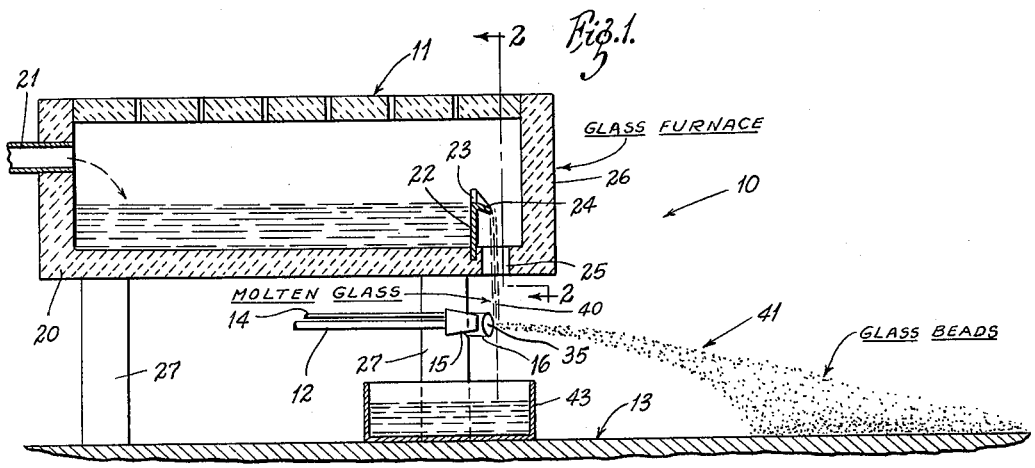
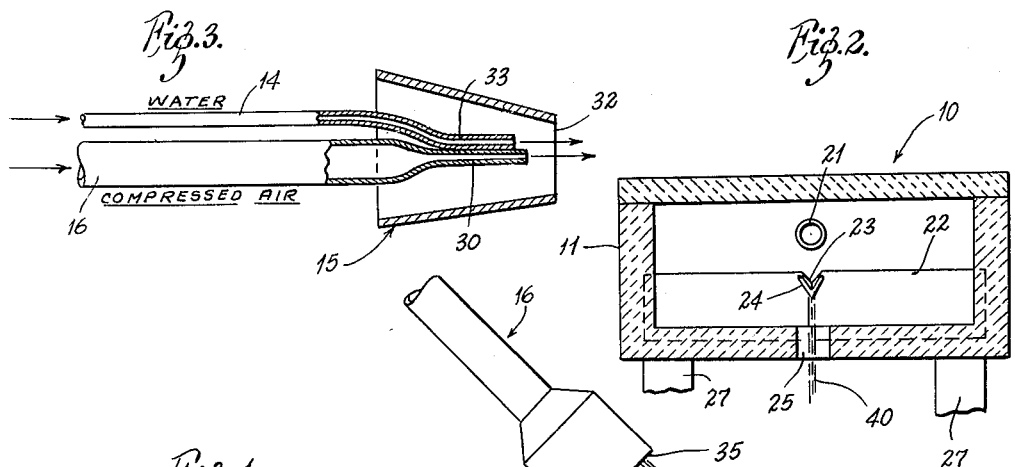
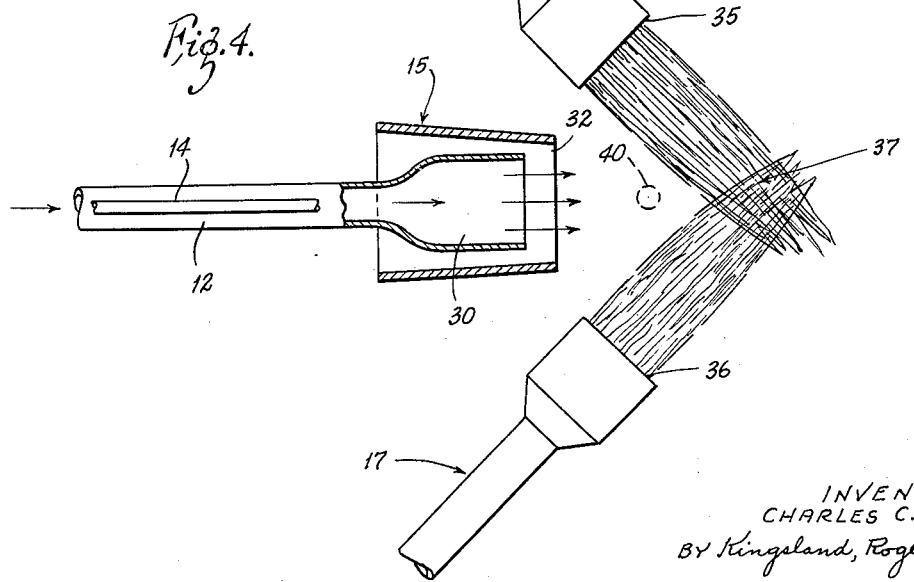
INVENTOR:
CHARLES C. BLAND,
BY Kingsland, Rogers & Ezell
ATTORNEYS

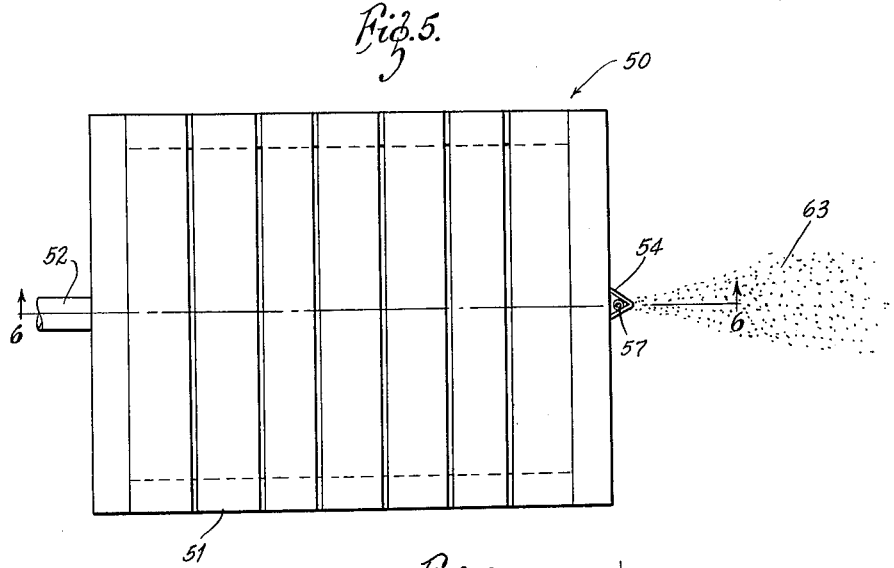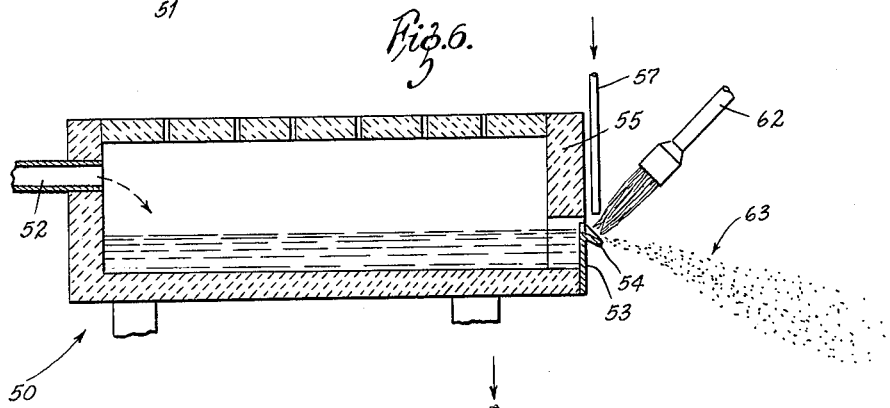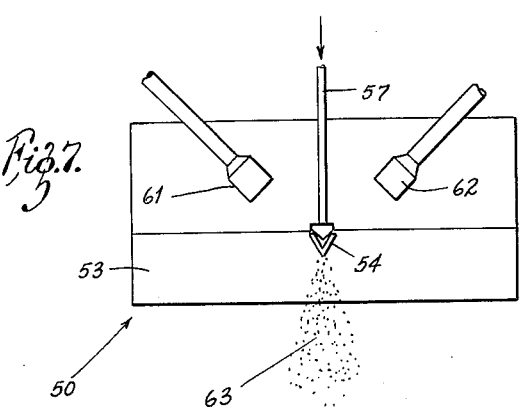

United States Patent Office 3,243,273
Patented Mar. 29, 1966

3,243,273
METHOD AND APPARATUS FOR PRODUCTION OF GLASS BEADS BY DISPERSION OF MOLTEN GLASS
Charles C. Bland, St. Louis, Mo., assignor to Flex-O-Lite Manufacturing Corporation, St. Louis, Mo., a corporation of Missouri
Filed Aug. 12, 1957, Ser. No. 677,651
10 Claims. (Cl. 65—21)

This invention relates to improvements in the production of small glass beads and in particular is concerned with a method for producing such glass beads by dispersing molten glass of low viscosity by the use of compressed fluid.

The glass beads of this invention find particular utility as reflective beads used in highway marking paints, roadside signs, provided with coatings of paint, enamels, lacquers, asphalts or thin plastic sheetings upon which the beads are embedded and which are adapted to be illuminated at night and for the reflective illumination of other surfaces through reflection from a beam of light directed upon the surface. Such glass beads are of small particle size and for optimum reflective brilliance should be of truly spherical configuration. Additionally, the glass beads of this invention can be used where other substantially spherical beads, having a particle size ranging from about 5 mesh down to 400 mesh U.S. Standard sieves, are desired. Such application is of very broad scope and the beads find usage in a large number of fields.

In the past, such glass beads of this small particle size have been conventionally produced in glass furnaces in which ground glass stock is introduced into a furnace in the form of a vertical stack or the like and upwardly directed gas is burned at a high temperature to carry the beads which are formed in a spherical configuration to the top of the furnace. This type of apparatus is well shown in the Charles C. Bland Patent No. 2,600,963, issued June 17, 1952, and assigned to applicant's assignee. Such apparatus is very effective in producing glass beads of the desired configuration, but is rather expensive and demands cumbersome and quite tall equipment. Additionally, the size of the glass beads is limited.

By means of the instant invention, there has been provided relatively simple and very effective apparatus in which the glass beads produced can be in a larger particle size than those heretofore produced and in which this particle size may range from relatively large glass beads of about 5 mesh size down to about 400 mesh. The apparatus is adapted to be used in a small space area and can be very simply operated by relatively unskilled workmen.

Essentially this invention comprises melting a glass charge to a molten liquid in a glass furnace and then dispensing the molten liquid while still in a low viscosity. The low viscosity stream is permitted to flow in spout or to fall in space by gravity and is then contacted by a high pressure stream of compressed air. It is to be understood, however, that the molten glass stream may be contacted by any desirable gas, such as steam under high pressure and that where the term compressed air is employed this includes other high pressure gases or fluids. The flowing molten glass or free falling low viscosity stream of molten glass when contacted by a confined jet of compressed air is dispersed into numerous small glass beads. The dispersion by the compressed air is carried out in such a manner that the dispersed beads are permitted to fall freely upon a collecting surface and during their free fall setting of the beads to the spherical form occurs. The glass beads may then be gathered from the collecting surface and used in the produced form or classified according to their size.

An essential feature of this invention resides in controlling the molten glass so that it is dispensed to the contacting stage in a stream of low viscosity. In general, this viscosity is determined by observation to be in the nature of the viscosity of No. 10 SAE motor oil at room temperature, or somewhat less, but for the purpose of control this may be in a higher range of about 10 to about 20 SAE motor oil. It has been found that where the viscosity of the molten stream is lower the beads produced are of a generally smaller particle size and that, conversely, where the viscosity increases the beads produced are larger. As a further means of control, the compressed air pressure may vary and in general the greater the pressure the smaller the glass beads.

Accordingly, it is a primary object of this invention to provide a method and apparatus for providing glass beads by dispersing molten glass of low viscosity by contact with a jet of high pressure or compressed fluid.

It is another object of this invention to provide apparatus and method for producing glass beads of small particle size in which a glass charge is melted and dispensed in a flowing or free falling stream of low viscosity fluid where it is dispersed by compressed air to form the glass beads.

It is still a further object of this invention to provide apparatus and method for producing glass beads of small particle size and spherical form in which glass is melted to a low viscosity and dispensed in a flowing or free falling stream of low viscosity and in which the stream is contacted by a directed jet of compressed air in which the glass beads produced by the dispersion of a molten stream are permitted to fall freely in space to set to a spherical configuration and are then stopped in flight by a collecting surface.

It is still another object of this invention to provide a method and apparatus for producing glass beads by flowing molten glass of low viscosity through a spout and directing compressed air on the spout to disperse the glass into space to form the beads.

Another object of this invention is to provide apparatus and method for producing glass beads of small spherical size in which flowing of low viscosity molten glass is contacted by a jet of compressed air and in which the dispersed glass is formed into beads of varying particle size by the controlling of the viscosity of the molten glass stream and the further controlling of the compressed air pressure.

Still another object of this invention is to provide a method and apparatus for providing glass beads by dispersing molten glass of low viscosity by contact with a jet of high pressure or compressed fluid and minimize the formation of glass wool by directing a very hot gas upon the dispersed bead stream downstream of the contact with the dispersing fluid.

Yet a further object of this invention is to provide apparatus and method for producing glass beads of small spherical particle size which is relatively simple and economical and can be employed under limitations of space by relatively unskilled operators.

Further objects of this invention will appear in the detailed description which follows and will be further apparent to those skilled in the art.

For the purpose of illustration, there is shown in the accompanying drawings preferred forms of the apparatus of this invention. It is to be understood that those drawings are for the purpose of illustration and example only, and that the invention is not limited thereto.

In the drawings:
FIGURE 1 is a view in vertical section through one embodiment of the apparatus of this invention;
FIGURE 2 is a view in section taken on the line 2—2 of FIGURE 1 showing a dispensing weir in the glass furnace which permits the overflow of molten glass in a free falling stream;

FIGURE 3 is an enlarged view in vertical section of the compressed air nozzle and a directing head which are employed with a water jet;

FIGURE 4 is a view in horizontal section of the compressed air nozzle and directing head showing the arrangement of gas burners desirably employed in this aparatus;

FIGURE 5 is a top plan view of a modified apparatus for forming the glass beads through dispersion of molten glass as it leaves the furnace spout;

FIGURE 6 is a view in vertical section the line 6—6 of FIGURE 5; and

FIGURE 7 is a view in front elevation of the modified apparatus.

A preferred form of the apparatus of this invention is generally indicated by the reference numeral 10 in FIGURES 1 and 2. The main components of the apparatus comprise a glass furnace 11, a compressed air conduit 12, and the collecting surface 13, which, as shown in the drawing, may simply comprise the floor spaced substantially underneath the compressed air conduit. It has been further found desirable to use in the apparatus of this invention a cold water quench tube 14 which is closely positioned to the compressed air conduit, an adjustable compressed air directing head 15, and a pair of converging burners 16 and 17 which are best shown in FIGURE 4.

The glass furnace is comprised of a ceramic tank 20 which is spaced substantially off the floor. A charging chute 21 is situated at the rear of the furnace and is adapted to charge glass stock to the furnace. Conventional heating means are employed to melt the glass stock and keep the glass in a low viscosity molten state, and such heating means will be readily understood although not shown in this drawing. At the forward end of the glass furnace is provided a weir plate 22 having a weir notch 23. This plate is desirably made of a suitable metal. The weir plate 22 is further provided with a spout 24 which is directed downwardly to dispense the liquid in a free falling stream into space through an opening 25 at the bottom of the furnace. It will be noted that the forward wall of the glass furnace, as designated at 26, provides a substantial space for the molten glass to fall through. As a further consequence of this particular spacing of the forward wall 26 from the weir plate 22, there is provided a heat barrier type of enclosure so that the liquid does not cool substantially which would tend to increase the viscosity of the free flowing stream.

The entire glass furnace 11 is supported a substantial distance off the ground by legs 27. This provides for a fair degree of free fall of the stream of liquid and dispersed beads.

Situated relatively close to the bottom of the glass furnace is the compressed air conduit 12. This conduit may be in the form of a laterally elongated nozzle 30 at its forward end which is of a restricted nature to discharge compressed air at a very high velocity. The nozzle end 30 of the compressed air conduit is disposed within a head 15. The head has a front opening 32 of a generally laterally elongated nature. This head is adjustable with respect to the nozzle and can be moved either forwardly or rearwardly by conventiontl means, not shown. The directing head provides for controlling of the jet of compressed air so that it may be directed squarely against the free falling molten glass stream.

A cold water quench tube 14 is situated directly over but may be within or under the compressed air conduit as shown in FIGURES 1 and 3. The outlet end 33 is situated slightly to the rear of the outlet end of the nozzle 30, and it will be noted that the open rear end of the directing head 15 is spaced substantially to the rear of these openings. Through the disposition of the nozzle 30 of the compressed air conduit and the outlet end 33 of the cold water quench tube inside the directing head, a mixing of the two is made possible. The directing head acts somewhat as an aspirator due to the high velocity of the compressed air directed into it and will suck some air from the outside space through the rear of the directing head and cause the mixing of the water from the cold water quench tube with the compressed air.

The two burners 16 and 17 are best shown in FIGURE 4. However, more burners may be used forming a ring of burners. Both of the burners 16 and 17 are gas burners in which a mixture of gas and air is burned at the outlet ends 35 and 36 of the burners 16 and 17, respectively. It will be observed that both of these burners are directed in a converging relationship in which the flames cross in the region indicated 37, or may be in tandem. As will appear further hereinbelow, this provides a very hot temperature for the dispersed beads as soon as they are formed from the molten stream of glass by the action of the compressed air jet and minimizes the formation of glass wool.

A modified form of furnace is shown in FIGURES 5 through 7. This apparatus is generally indicated by the reference numeral 50, and comprises a furnace 51, which is generally the same in construction as the furnace 11, with the exception of the front end portion. Thus this furnace has a charging chute 52 entering at the rear of the furnace and is spaced from the floor similarly to the furnace 11 previously described. However, the front end is provided only with the weir plate 53 and a spout 54 and the protective enclosure 26 of the furnace 11 has been deleted. In this apparatus, the molten glass is dispensed directly underneath the overhanging front portion 55 of the furnace through the weir opening onto the spout 54. A vertically directed compressed air tube 57 is positioned over the spout to direct compressed air on the stream of glass as it flows through the spout.

A pair of burners 61 and 62 are positioned at the front of the furnace and are directed in a converging position to direct combustion gases upon the spout. These hot gases tend to keep the stream of molten glass in a highly fluid condition and serve the further function of preventing the formation of glass wool. It will be understood that the burners may be of the same type as burners 16 and 17, and that also the compressed air tube 57, where desired, may be of the same construction as the apparatus shown in FIGURES 3 and 4 previously described.

*Production of the beads*

In the production of the glass beads according to the apparatus of FIGURES 1 and 2 of this invention, glass stock is charged through the chute 21 to the glass furnace 11. The furnace is heated to a high temperature which may vary in accordance with the composition of the glass stock but which should be sufficient to change the material to a liquid of low viscosity, which is substantially lower than that conventionally obtained in glass manufacture. The charging may be carried out continuously in a metered fashion to cause the liquid glass to overflow the weir plate through the weir notch 23 and the weir spout 24. It is, however, obvious that various means of control for metering the liquid may be employed where desired.

When the glass stock is heated to the higher temperature in the glass furnace required to convert the liquid to a low viscosity, the overflowing liquid will drop in a free falling stream 40 through the opening 25 in the bottom of the glass furnace. The viscosity of this liquid should be in the general neighborhood of somewhat less than 10 weight SAE motor oil at room temperature up to about 20 SAE weight motor oil. It will be understood that the higher the viscosity in general the larger are the glass beads that are produced.

As the free flowing liquid glass stream 40 falls through the opening 25 in the bottom of the glass furnace, it is contacted by a blast or jet of compressed air from the compressed air conduit. This blast of air extends completely across the transverse diameter of the molten stream of liquid glass, as appears in FIGURE 4, due to the horizontally elongated nature of the nozzle 30 and the outlet end 32 of the directing head 15. When the blast of compressed air contacts the molten liquid stream, the stream will be dispersed and broken up into individual droplets of liquid glass which almost immediately set into spherical glass beads. These beads are blown generally in the path 41 shown in FIGURE 1. Thus it will be observed that the beads are blown in a generally horizontal direction and eventually tail out onto the floor 13 which acts as a collecting surface. A substantial free fall in space of the beads is provided due to the positioning of the compressed air conduit 12 a substantial distance off the ground. This provides for a sufficient setting time where the vertical fall is adequate.

Although it has been found that the beads will set substantially due to their free fall in the dispersed stream 41, it has been found desirable to add a cold water quench along with the jet of compressed air. Thus in the process, cold water is dispensed through the outlet 33 in the cold water quench tube 14 within the directing head 15. This water is mixed with the compressed air due to the aspirating action within the directing head. When the water mixed with the compressed air contacts the free falling stream of liquid glass, a greater cooling is effected than can be obtained in the air alone. This assists in the setting of the beads to the spherical configuration so that when they strike the ground or other collecting surface they are not deformed.

It has further been found desirable to provide the converging gas burners 16 and 17 to combat the formation of glass wool in the dispersing action when the compressed air contacts the liquid stream of glass 40. Under certain circumstances glass wool is formed in the contacting action of the compressed air with the stream of glass and such formation is an undesirable feature. Through the action of the converging burners 16 and 17, the gas flames meet in the region 37 which is spaced just slightly in advance of the stream 40 where it is contacted by the jet of compressed air. Since the glass wool that might tend to be formed as tails on some of the beads is of a very minute diameter, the high degree of heat in the converging region of the gas flames designated at 37 melts the glass wool and causes the reformation of substantially entirely spherical glass beads.

The modified apparatus of FIGURES 5, 6 and 7 is employed in a similar manner to that of the apparatus of FIGURES 1 and 2. Thus glass is melted to a low viscosity in the furnace 50 and is dispensed through the weir 53 and the spout 54.

As the molten glass flows down the spout 54, it is contacted near the outer end with compressed air through the tube 57. Due to the downwardly sloping nature of the spout and the positioning of the compressed air tube, glass beads will be dispersed in the path designated 63.

The gas burners 61 and 62 directed upon the spout at the point of contact of the compressed air with the molten stream of glass establishes a high temperature in this region and aids in keeping the glass highly fluid. In addition, this high temperature obviates the formation of glass wool or beads with small tail portions since the region immediately downstream of the contacting stage is maintained very hot and any such glass wool will be melted and tend to reform into small glass beads.

In the modified apparatus of FIGURES 5 through 7, the beads are dispersed and permitted to fall in a free manner to obtain their set in the same fashion as previously described.

In the production of the glass beads, it has been found desirable to use a compressed air pressure in the general order of 100 pounds per square inch. However, this can be increased or decreased. In general, the increase will tend to cause the formation of smaller glass beads while the decrease will tend to cause the formation of larger glass beads.

In the production of the glass beads according to this invention, the glass beads after they are formed and after they collect upon the floor 13 may be gathered in conventional manner and either used directly in a desired application for reflective coatings or other usages or can be classified according to size. Any glass which is not dispersed may be collected in the tank 43 shown in FIGURE 1. This tank is filled with water and the reclaimed glass may be recycled through the charging chute back to the glass furnace.

The apparatus and process of this invention have been found to be very effective in the production of glass beads. The formation of glass wool may be substantially eliminated through the use of gas flames in the gas burners to such an extent that less than one-tenth of one percent of glass wool is formed. The entire apparatus is extremely simple in nature and is of a relatively uncomplicated construction. Further, the space limitations are not demanding and the high head room of conventional glass bead furnaces has been obviated. The process of the invention is likewise simple to carry out and both the apparatus and process can be employed by relatively unskilled workmen to produce glass beads of varying particle size with a good degree of quality and size control.

Various changes and modifications may be made in this invention as will be apparent to those skilled in the art. Such changes and modifications are within the scope and teaching of this invention as defined by the claims appended hereto.

What is claimed is:

1. A process for preparing substantially spherical glass beads which comprises providing a stream of molten glass of low viscosity, contacting the stream with a transversely directed high pressure blast of compressed gas and thereby dispersing the molten glass in a horizontal path into space, into droplets of glass, establishing a high temperature region above the melting temperature of the glass immediately downstream of the intersecting paths of the stream of molten glass and the blast of compressed gas to minimize the formation of glass wool and providing a space for the droplets to fall in to cool and set the droplets to glass beads of a spherical configuration.

2. A process for preparing substantially spherical glass beads which comprises providing a free falling stream of molten glass of low viscosity, contacting the stream with a high pressure blast of compressed air and thereby dispersing the molten glass into droplets of glass, and providing a space for the droplets to fall in to cool and set the droplets to glass beads of a spherical configuration and accelerating the cooling and setting of the beads by the addition of water to the compressed air blast, and establishing a high temperature region immediately downstream of the intersecting paths of the stream of molten glass and the blast of compressed air to minimize the formation of glass wool, said high temperature region being established by burning a fuel gas and projecting the flame into the path of said droplets.

3. A process for preparing substantially spherical glass beads which comprises flowing a stream of molten glass of low viscosity through an open spout, directing a blast of compressed gas against the spout and the stream of molten glass to disperse the molten glass in a horizontal path into space into spherical droplets of glass and maintaining the space around the spout at a high temperature by directing a fuel burner flame adjacent and downstream of the juncture of said gas blast and molten glass stream.

4. The method of forming glass beads comprising discharging a molten glass stream of relatively low viscosity in a vertically downward direction from a source of supply, discharging a blast of high velocity gas against said stream at an angle thereto and of sufficient magnitude to disperse said stream into a multiplicity of glass particles, said blast immediately thereafter carrying said paricles through a path maintained at an elevated temperature sufficiently high to allow surface tension to shape the particles into spherical form, cooling said spheres to solidify same and collecting said spheres.

5. The method of forming glass beads comprising discharging a molten glass stream in a vertically downward direction from a source of supply, discharging a blast of high velocity gas against said stream at an angle thereto and of sufficient magnitude to disperse said stream into a multiplicity of glass particles, said blast immediately thereafter carrying said particles through a path maintained at an elevated temperature sufficiently high to allow surface tension to shape the particles into spherical form, cooling said spheres to solidify same and collecting said spheres.

6. Apparatus for the production of glass beads which comprises a furnace for heating glass stock of a low viscosity liquid, means for dispensing the low viscosity molten glass from the furnace in a free-falling stream, means spaced beneath said aforementioned means for directing a blast of compressed air transversely against the molten glass stream to disperse the glass in the form of dispersed droplets of molten glass into an air space to cool and set the droplets of spherical glass beads, and means for establishing a high temperature region above the melting temperature of the glass immediately downstream of the intersecting paths of the molten glass stream and the blast of gas to minimize the formation of glass wool, said last named means comprising a gas burner having a nozzle directed substantially concurrently with the path of the dispersed droplets.

7. Apparatus for the production of glass beads which comprises a furnace for heating glass stock to a low viscosity liquid, a top cover for said furnace, means for dispensing the low viscosity molten glass from the furnace in a free falling stream, said last named means comprising an outlet for the molten glass stream which is disposed within the furnace in spaced relation to and above the bottom edges of side walls enclosing said outlet of the furnace and an opening in the bottom for directing the stream by gravity from the outlet through the opening while the portion of the stream within the furnace is within a high temperature region, means spaced beneath said outlet for directing a blast of compressed air transversely against the molten glass stream substantially directly underneath the furnace to disperse the glass in the form of dispersed droplets of molten glass into an air space to cool and set the droplets to spherical glass beads, and means for establishing a high temperature region above the melting temperature of the glass immediately downstream of the intersecting paths of the molten glass stream and the blast of gas to minimize the formation of glass wool, said last named means comprising a gas burner having a nozzle directed substantially concurrently with the path of the dispersed droplets.

8. Apparatus for the production of glass beads which comprises a furnace for heating glass stock to a low viscosity liquid, means for dispensing the low viscosity molten glass from the furnace in a stream, means for directing a blast of compressed air transversely against the molten glass stream to disperse the glass in the form of dispersed droplets of molten glass into an air space to cool and set the droplets to spherical glass beads, and means for mixing water with the compressed air to accelerate the cooling and setting of the glass beads, said last named means comprising a water conduit having an outlet directing the water into the blast of air within a mixing and directing element, said mixing and directing element being in the form of a sleeve having an open front and rear end, said front end being laterally elongated and adapted to direct mixed compressed air and water against the stream of molten glass, and means for establishing a high temperature region above the melting temperature of the glass immediately downstream of the intersecting paths of the molten glass stream and the blast of gas to minimize the formation of glass wool.

9. Apparatus for the production of glass beads which comprises a furnace for heating glass stock to a low viscosity liquid, means for dispensing the low viscosity molten glass from the furnace in a free falling stream, means for directing a blast of compressed air transversely against the molten glass stream to disperse the glass in the form of dispersed droplets of molten glass into an air space to cool and set the droplets to spherical glass beads, and means for mixing water with the compressed air to accelerate the cooling and setting of the glass beads, said last named means comprising a water conduit having an outlet directing the water into the blast of air within a mixing and directing element, said mixing and directing element being in the form of a sleeve having an open front and rear end, said front end being elongated horizontally and adapted to direct mixed compressed air and water against the stream of molten glass, and means for establishing a high temperature region immediately downstream of the intersecting paths of the molten glass stream and the blast of gas to minimize the formation of glass wool, said means comprising a gas burner with the flame directed substantially concurrently into the path of the dispersed molten glass.

10. Apparatus for the production of glass beads which comprises a furnace for heating glass stock to a low viscosity liquid, means for dispensing the low viscosity molten glass from the furnace through an open spout, means for directing a blast of compressed air downwardly and at an angle against the spout and the stream of molten glass to disperse the glass in the form of dispersed droplets of molten glass into an air space to cool and set the droplets to spherical glass beads, and means for establishing a high temperature region around the intersecting paths of the compressed air and the molten glass stream and immediately downstream thereof, said means comprising at least one gas burner with the flame directed into said region.

References Cited by the Examiner

UNITED STATES PATENTS

| 191,524 | 6/1877 | Elbers | 18—47.3 |
|---|---|---|---|
| 2,126,411 | 8/1938 | Powell | 18—47.3 |
| 2,159,433 | 5/1939 | Ervin | 18—2.5 |
| 2,255,206 | 9/1941 | Duncan. | |
| 2,311,870 | 2/1943 | Richardson et al. | |
| 2,460,993 | 2/1949 | Le Brasse et al. | |
| 2,500,801 | 3/1950 | Church. | |
| 2,578,100 | 12/1951 | Stalego. | |
| 2,585,496 | 2/1952 | Powell. | |
| 2,616,124 | 11/1952 | Lyle. | |
| 2,687,551 | 8/1954 | Stalego. | |
| 2,702,407 | 2/1955 | Osborne. | |
| 2,714,622 | 8/1955 | McMullen. | |
| 2,739,348 | 3/1956 | Rayburn. | |

FOREIGN PATENTS

| 495,779 | 9/1950 | Belgium. |
|---|---|---|
| 11,303 | 1886 | Great Britain. |

DONALL H. SYLVESTER, *Primary Examiner.*

MICHAEL V. BRINDISI, WILLIAM J. STEPHENSON,
*Examiners.*

P. MINTZ, L. D. RUTLEDGE, G. R. MYERS, *Assistant Examiners.*